ated Oct. 19, 1971

United States Patent Office

3,613,367
CONSTANT SPEED DRIVE
Charles Philip Smith and John Roger Wynne, Wolverhampton, England, assignors to H. M. Hobson Limited, London, England
Filed Nov. 12, 1969, Ser. No. 875,948
Claims priority, application Great Britain, Nov. 12, 1968, 53,597/68
Int. Cl. F16d *31/02*
U.S. Cl. 60—54
4 Claims

ABSTRACT OF THE DISCLOSURE

A mechanism for driving a load at constant speed from a variable speed input shaft, which comprises epicyclic gearing including a member driven by the input shaft, a member driving an output shaft connected to the load and a reaction member, a variable delivery hydraulic pump connected to be driven by the reaction member and having a pintle nozzle which adjusts its area automatically in the sense to maintain the delivery pressure of the pump substantially constant, a pelton wheel on the output shaft driven by liquid discharged by the nozzle, mechanism for sensing the rotational speed of the output shaft and means controlled by the sensing mechanism for controlling the delivery of the pump in the sense to maintain the rotational speed of the output shaft at a constant level.

---

This invention relates to constant speed drives.

It is a primary object of the invention to provide a mechanism for driving a load at constant speed from a variable speed input shaft.

The invention features epicyclic gearing including a member driven by the input shaft, a member driving an output shaft connected to the load and a reaction member, a variable delivery hydraulic pump connected to be driven by the reaction member and having a pintle nozzle which adjusts its area automatically in the sense to maintain the delivery pressure of the pump substantially constant, a pelton wheel on the output shaft driven by liquid discharged by the nozzle, mechanism for sensing the rotational speed of the output shaft and means controlled by the sensing mechanism for controlling the delivery of the pump in the sense to maintain the rotational speed of the output shaft at a constant value.

For stability it is desirable that the speed sensing mechanism should generate a signal which is not only representative of the rotational speed $N_0$ of the output shaft but which also contains terms proportional to $$\frac{dN_0}{dt} \text{ and } \frac{d^2N_0}{dt^2}$$

and in its preferred form the mechanism according to the invention provides an electronic signal shaping network for achieving this result.

Figure 1:
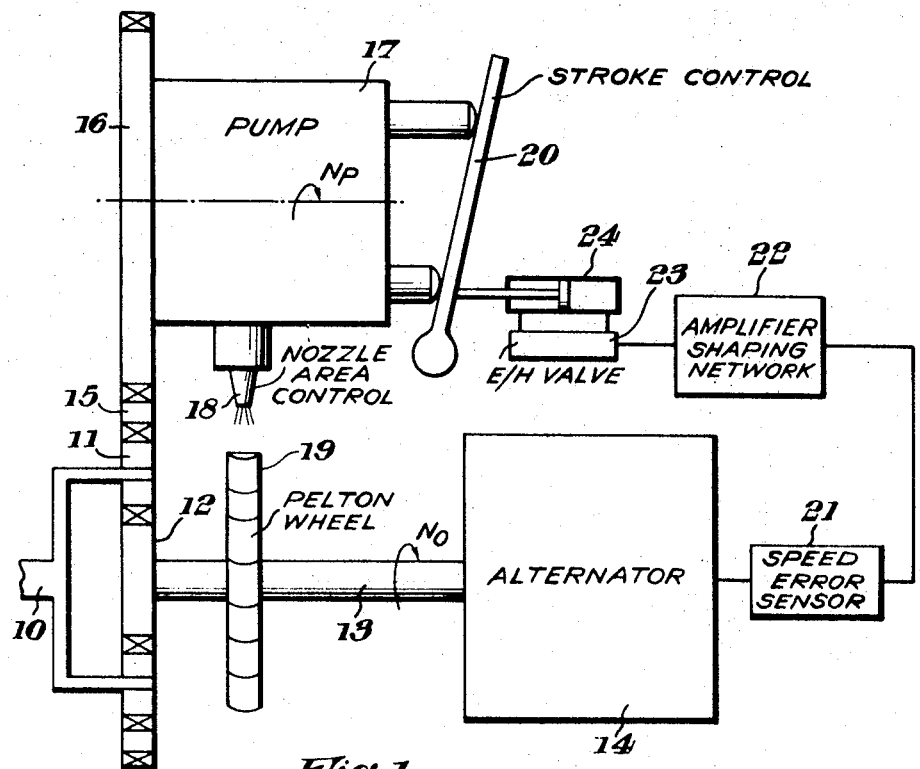
Figure 2:
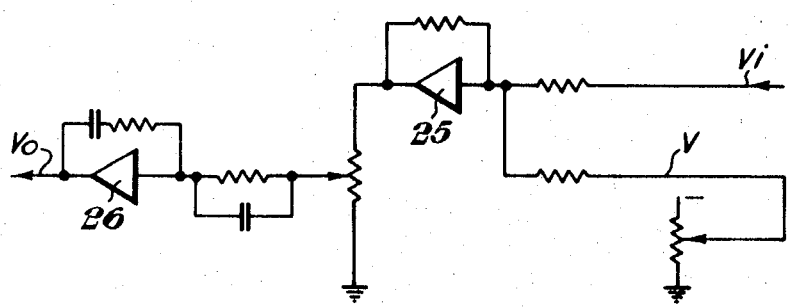

A constant speed drive for aircraft according to the invention for driving an alternator at constant speed will now be described, by way of example, with reference to the accompanying drawings, in which:

FIG. 1 is a block diagram and
FIG. 2 shows part of the signal shaping network.

As shown in FIG. 1, an input shaft 10 driven by the engine of an aircraft is connected to the planet carrier 11 of epicyclic gearing, of which the sun wheel 12 is fixed to an output shaft 13 driving an alternator 14 and the annulus 15, which constitutes the reaction member, meshes with a gear 16 driving a variable stroke hydraulic pump 17. The pump 17 discharges liquid through a pintle nozzle 18 on to a pelton wheel 19 on the output shaft 13. The pump 17 has a swash plate 20 for adjusting its stroke and provides reaction at the annulus 15 principally by pump drag, allowing the annulus to slip at a speed corresponding to the stroke of the pump and feeding hydraulic energy back to the pelton wheel 19 through the nozzle 18. The nozzle 18 opens progressively as the flow in the pump increases to maintain substantially constant the pump pressure and the velocity of flow of liquid on to the pelton wheel 19.

The mechanism includes a speed error sensor 21 for sensing departures in speed $N_0$ from the desired value, a shaping network 22, an electrohydraulic valve 23 controlled by the network 22 and a hydraulic jack 24 controlled by the valve 23 and coupled to the swash plate 20.

In the circuit shown in FIG. 2, the input to an amplifier 25 is the difference between a voltage $$V_1 = R(N_0 \pm \Delta N_0)$$

where $\Delta N_0$ is the speed error in the output shaft and a fixed voltage $V = RN_0$. The output $V_0$ of a second amplifier 26 is of the form $$R_1 \Delta N_0 + R_2 \frac{d\Delta N_0}{dt} + R_3 \frac{d^2 \Delta N_0}{dt^2}$$

where $R_1$, $R_2$ and $R_3$ are constants and, after further amplification, is applied to the electrohydraulic valve 23.

As will be appreciated the drag of the pump 17 reacts the load on the alternator 14. At zero alternator load there is still drag on the annulus 15 due to the pump which could cause the alternator to run away. To prevent this the nozzle 18 is provided with a stop which, upon reduction of the stroke of the pump to a certain small value, prevents further reduction of the area of the nozzle. Accordingly upon further reduction of the stroke of the pump the pump pressure is able to fall to reduce the drag and therefore the reaction on the annulus 15.

Another stop is provided to prevent the area of the nozzle from increasing beyond a certain limit. This provides for the case of a transient excessive load on the alternator. In this event the resultant increase in the stroke of the pump will cause a transient increase in pump pressure to increase the reaction on the annulus sufficiently to enable the increased load to be held for a short period.

What we claim as our invention and desire to secure by Letters Patent is:

1. A driving mechanism for driving a load at constant speed from a variable speed input shaft, which comprises epicyclic gearing including a member driven by the input shaft, a member driving an output shaft connected to the load and a reaction member, a variable delivery hydraulic pump connected to be driven by the reaction member and having a pintle nozzle which adjusts its area automatically in the sense to maintain the delivery pressure of the pump substantially constant, a pelton wheel on the output shaft driven by liquid discharged by the nozzle, mechanism for sensing the rotational speed of the output shaft and means controlled by the sensing mechanism for controlling the delivery of the pump in the sense to maintain the rotational speed of the output shaft at a constant value.

2. A driving mechanism as claimed in claim 1, in which the speed sensing mechanism includes an electronic signal shaping network which generates a signal which is representative not only of the rotational speed $N_0$ of the output shaft but also contains terms proportional to $$\frac{dN_0}{dt} \text{ and } \frac{d^2N_0}{dt^2}$$

3. A driving mechanism as claimed in claim 1 in which the pintle nozzle is provided with a stop which, upon reducton of the stroke of the pump to a certain small value, prevents further reduction of the area of the nozzle.

4. A driving mechanism as claimed in claim 1 which includes a stop for preventing the area of the pintle nozzle from increasing beyond a predetermined limit.

References Cited

UNITED STATES PATENTS

| 3,172,263 | 3/1965 | Quick et al. | 60—54 |
| 3,197,961 | 8/1965 | Quick et al. | 60—54 X |

EDGAR W. GEOGHEGAN, Primary Examiner

U.S. Cl. X.R.

60—52 VS